(12) United States Patent
Watanabe et al.

(10) Patent No.: US 10,114,592 B2
(45) Date of Patent: Oct. 30, 2018

(54) IMAGE FORMING SYSTEM AND IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Takeshi Watanabe, Yokohama Kanagawa (JP); Tatsuya Kitajima, Kawasaki Kanagawa (JP); Yukio Futamata, Shimizu Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 289 days.

(21) Appl. No.: 15/018,972

(22) Filed: Feb. 9, 2016

(65) Prior Publication Data

US 2017/0228197 A1    Aug. 10, 2017

(51) Int. Cl.
*G06F 3/12* (2006.01)
*H04N 1/00* (2006.01)
(Continued)

(52) U.S. Cl.
CPC .......... *G06F 3/1204* (2013.01); *G06F 3/1203* (2013.01); *G06F 3/1237* (2013.01); *G06F 3/1238* (2013.01); *G06F 3/1262* (2013.01); *H04N 1/00326* (2013.01); *H04N 1/00411* (2013.01); *H04N 1/44* (2013.01); *H04N 1/4406* (2013.01); *G06F 21/608* (2013.01); *H04N 1/00204* (2013.01); *H04N 1/00413* (2013.01); *H04N 2201/0094* (2013.01)

(58) Field of Classification Search
None
See application file for complete search history.

(56) References Cited

U.S. PATENT DOCUMENTS 6,650,431 B1    11/2003  Roberts et al.
2005/0022104 A1 *  1/2005  Wrenholt ........... H04N 1/00209
                                              715/205
(Continued)

OTHER PUBLICATIONS

Extended European Search Report for European Patent Application No. 17154524.7 dated Jun. 28, 2017.

*Primary Examiner* — John R Wallace
(74) *Attorney, Agent, or Firm* — Amin, Turocy & Watson LLP

(57) ABSTRACT

An image forming system of an embodiment includes a terminal device that transmits first print data to print an image in monochrome, second print data to print the image in color and a user ID; a print data storage section that stores the first print data, the second print data and the user ID transmitted from the terminal device in an associated manner; an authentication section that authenticates a user; a list acquisition section that acquires a list including the first and second print data associated with the user ID of the user authenticated by the authentication section; a print data acquisition section that acquires one print data selected from the acquired list by the list acquisition section; and an image forming section that prints an image formed with the print data acquired by the print data acquisition section.

13 Claims, 7 Drawing Sheets

(51) Int. Cl.
*H04N 1/44* (2006.01)
*G06F 21/60* (2013.01)

(56) References Cited

U.S. PATENT DOCUMENTS

| | | |
|---|---|---|
| 2006/0098231 A1 | 5/2006 | Konishi |
| 2008/0082702 A1 | 4/2008 | Ohtsu |
| 2008/0218792 A1 | 9/2008 | Murata et al. |
| 2010/0245899 A1* | 9/2010 | Hirama .................. G06F 3/121 358/1.15 |
| 2011/0317215 A1 | 12/2011 | Ida et al. |
| 2012/0262742 A1 | 10/2012 | Yano et al. |
| 2015/0002882 A1* | 1/2015 | Nakajima ............. G06F 3/1218 358/1.14 |
| 2015/0302282 A1* | 10/2015 | Osuki .................... G06K 15/12 358/1.9 |
| 2015/0381827 A1* | 12/2015 | Kambegawa ........ H04N 1/0023 358/1.15 |
| 2016/0117134 A1* | 4/2016 | Sasaki .................... G06F 3/122 358/1.15 |

* cited by examiner

IMAGE FORMING SYSTEM AND IMAGE FORMING APPARATUS

FIELD

Embodiments described herein relate generally to an image forming system, an image forming apparatus and an image forming method.

BACKGROUND

In recent years, in order to manage information in an office, an MDS (Management Device System) becomes popular. In the MDS, if a user is authenticated with an image forming apparatus, the image forming apparatus prints a document to manage information used to avoid the theft or losing of the printed object. The image forming apparatus is an MFP (Multifunction Peripheral) that executes a printing operation, a scanning operation, a copy operation and the like. In the MDS, in order to reduce the cost of printing of the document, a monochrome printing which prints the document with the use of one color is recommended. However, in a case in which a user is not satisfied with a print object obtained by printing a color document monochromatically, it is necessary for the user to execute a color printing on the document. In this case, the user has to operate a terminal device in use again to instruct the MFP to print after selecting the color printing. Then, the user carries out an authentication operation again with the MFP to obtain color-printed print object. In this way, in a case in which the user is not satisfied with the print object, the user has to move between the terminal device and the MFP for several times, resulting in troublesome jobs.

DETAILED DESCRIPTION

An image forming system of an embodiment comprises a terminal device, a print data storage section, an authentication section, a list acquisition section, a print data acquisition section and an image forming section. The terminal device sends first print data of an image to be printed in monochrome, second print data of the image to be printed in color and a user ID of the user. The print data storage section stores the first print data, the second print data and the user ID sent from the terminal device in an associated manner. The authentication section executes an authentication operation for a user. The list acquisition section acquires a list including the first and the second print data associated with the user ID of the user authenticated by the authentication section. The print data acquisition section acquires one print data from the list acquired by the list acquisition section. The image forming section prints an image formed with the first or the second print data acquired by the print data acquisition section.

Figure 1:
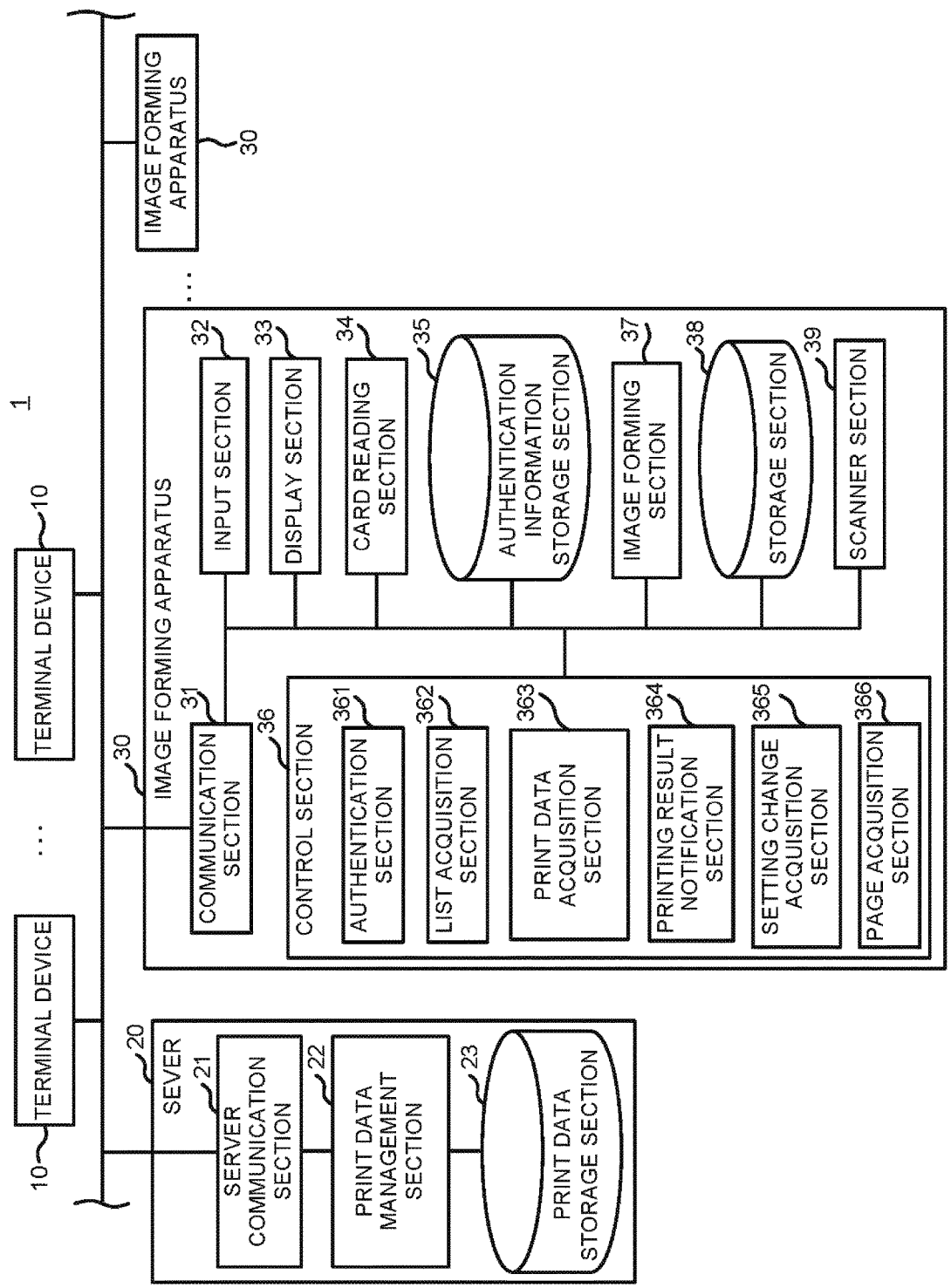
FIG. 1 is a diagram illustrating a constitution of an image forming system according to the preset embodiment.

Hereinafter, the image forming system and an image forming apparatus of the embodiment are described with reference to the accompanying drawings. FIG. 1 is a diagram illustrating a constitution of an image forming system 1 according to an embodiment. The image forming system 1 comprises at least one terminal device 10, a server 20 and at least one image forming apparatus 30. The terminal device 10 may be any one of a desktop computer, a notebook computer, a tablet computer and a smart phone. The terminal device 10 generates print data used to print a document. A user operates the terminal device 10 to select the document serving as a print target. The terminal device 10, if receiving an instruction for printing from the user, sends print data relating to the document and a user ID for identifying a user to the server 20. The print data includes monochrome print data used to print the document monochromatically and color print data used to execute a color printing on the document. The terminal device 10 also transmits the color print data to the server 20 after transmitting the monochrome print data to the server 20 according to the print instruction. A correspondence relation between the monochrome print data and the color print data transmitted according to one instruction of the user is detected with the use of identification information. The identification information can uniquely identify the monochrome print data and the color print data in the image forming system 1.

The print data includes printing image data, setting information and identification information. The printing image data indicates a print image. The printing image data includes monochrome printing image data used in the monochrome printing and color printing image data used in the color printing. The setting information which is also called as header information is information relating to printing. The setting information includes information indicating which one of the monochrome printing and the color printing is carried out and information indicating which one of simplex printing and duplex printing is carried out. The print data further includes information indicating that a plurality of pages is arranged in one page without duplication to be printed. The print data further includes information indicating a size of a sheet on which an image is printed.

The server 20 stores the monochrome print data and the color print data received from the terminal device 10. The server 20 transmits the stored print data to the image forming apparatus 30. The server 20 deletes one of the monochrome print data and the color print data from the stored print data based on a printing result in the image forming apparatus 30. The printing result indicates the final print data to be printed in response to an instruction of the user in the image forming apparatus 30. Furthermore, the server 20 may delete at least one print data of the first and second print data after the image forming apparatus 30 finishes a printing operation.

The image forming apparatus 30 acquires print data selected by the user from the server 20. The image forming apparatus 30 forms an image with the use of the acquired print data from the server 20. The image forming apparatus 30 carries out a printing operation through fixing the formed image on a sheet-like paper or a film. Furthermore, the image forming apparatus 30 may be an apparatus for fixing a toner image on an image receiving medium or an inkjet-system apparatus. The image forming apparatus 30 may be either of a printer device and an MFP.

Hereinafter, the server 20 and the image forming apparatus 30 are further described. The server 20 comprises a server communication section 21, a print data management section 22 and a print data storage section 23. The server communication section 21 outputs information received from the terminal device 10 or the image forming apparatus 30 to the print data management section 22. Further, the server communication section 21 transmits the information input from the print data management section 22 to the image forming apparatus 30. For example, the server communication section 21 receives the monochrome print data and the color print data from the terminal device 10. The server communication section 21 receives a list request, a print data request and a printing result from the image forming apparatus 30. The server communication section 21 transmits the print data input from the print data management section 22 to the image forming apparatus 30. The list request which is an instruction for requesting a print data list includes the user ID of the user who operates the image forming apparatus 30. The print data request includes identification information and an instruction for requesting print data indicated by the identification information.

The print data management section 22 associates the print data received from the terminal device 10 through the server communication section 21 with the user ID and enables the print data storage section 23 to store the associated print data and the user ID. The print data management section 22 creates a print data list if the server communication section 21 receives the list request. The print data list is a list of print data associated with the user ID contained in the list request among the print data stored in the print data storage section 23. The print data management section 22 reads out the print data indicated by the print request information from the print data storage section 23 if the server communication section 21 receives the print data request. The print data management section 22 transmits the print data as a response to the print data request through the server communication section 21 to the image forming apparatus 30. The print data management section 22 deletes, if the server communication section 21 receives a printing result, the print data stored in the print data storage section 23 based on the printing result.

The print data management section 22 updates setting information of the print data based on setting change information which is received by the server communication section 21 from the image forming apparatus 30. The setting change information contains either or both of an instruction for switching the simplex printing and the duplex printing and an instruction for arranging a plurality of pages together in one page to print the page. The setting change information may further contain instruction indicating other information relating to printing.

The print data management section 22 changes the setting information of the color print data based on page information that is received by the server communication section 21 from the image forming apparatus 30. The page information indicates one or a plurality of pages serving as a print target among the pages indicated by the color printing data in the color print data serving as a change target. The print data management section 22 changes the setting information to update the designated color print data with the color print data used to print pages indicated by the page information.

The image forming apparatus 30 includes a communication section 31, an input section 32, a display section 33, a card reading section 34, an authentication information storage section 35, a control section 36, an image forming section 37, a storage section 38 and a scanner section 39. The communication section 31 transmits the list request, the print data request and the printing result to the server 20. The communication section 31 receives the print data list and the print data from the server 20. The input section 32 receives an operation by the user. The input section 32 includes, for example, a keyboard and a pointing device. The display section 33 displays information for the user. The display section 33 includes, for example, a liquid crystal display panel. Furthermore, a touch panel or a touch screen which combines a display device and an input device may be applied in the input section 32 and the display section 33. The card reading section 34 reads a card carried by the user to acquire the user ID and a password.

The authentication information storage section 35 stores a user ID and a password in an associated manner. The user ID and the password stored in the authentication information storage section 35 refer to the user ID and the password of the user who is permitted to use the image forming apparatus 30. The image forming section 37 carries out a printing operation on a sheet-like image receiving medium under the control of the control section 36. The storage section 38 stores the monochrome print data that is finally printed in the image forming section 37. The scanner section 39 reads the print matter printed by the image forming section 37.

The control section 36 includes an authentication section 361, a list acquisition section 362, a print data acquisition section 363, a printing result notification section 364, a setting change acquisition section 365 and a page acquisition section 366. The authentication section 361 acquires the user ID and the password through the input section 32 or the card reading section 34. The authentication section 361 determines whether or not the combination of the user ID and the password is stored in the authentication information storage section 35. In a case in which the combination of the user ID and the password is stored in the authentication information storage section 35, the authentication section 361 permits the user to use the image forming apparatus 30. If the combination is not stored in the authentication information storage section 35, the authentication section 361 does not permit the user to use the image forming apparatus 30.

The list acquisition section 362 generates the list request if the authentication section 361 permits the user to use the image forming apparatus 30. The list acquisition section 362 enables the communication section 31 to transmit the list request to the server 20. The list acquisition section 362 acquires the print data list that is received from the server 20 by the communication section 31 as a response to the list request. The list acquisition section 362 outputs the print data list to the display section 33 and enables the display section 33 to display the print data list.

The print data acquisition section 363 acquires selection information received by the input section 32. The selection information indicates the print data selected by the user as a print target between the monochrome print data and the color print data contained in the print data list. The print data acquisition section 363 generates the print data request for requesting the print data indicated by the selection information. The print data acquisition section 363 enables the communication section 31 to transmit the print data request to the server 20. The print data acquisition section 363 acquires the print data received from the server 20 by the communication section 31 as a response to the print data request. The print data acquired by the print data acquisition section 363 is either of the monochrome print data and the color print data. The print data acquisition section 363 outputs the print data to the image forming section 37 to enable the image forming section 37 to execute a printing operation based on the print data.

The printing result notification section 364 detects the final print data among the print data to be printed according to the instruction of the user when the input section 32 receives a log-out operation of the user. The printing result notification section 364 generates printing result indicating the detected final print data. The printing result notification section 364 enables the communication section 31 to transmit the print data to the server 20.

The setting change acquisition section 365 enables the display section 33 to display a change menu used to change the setting information in the print data. The setting change acquisition section 365 acquires the setting change information that instructs the change of the setting information from the input section 32. The setting change acquisition section 365 outputs the setting change information to the communication section 31 and enables the communication section 31 to transmit the setting change information to the server 20.

The page acquisition section 366 acquires the page information indicating the page on which the user desires to execute a color printing on the print object printed monochromatically. The user reads the pages that are desired to be color-printed with the scanner section 39 among the pages of the print object to be printed monochromatically to acquire the page information. Alternatively, the page information may be acquired through the operation of the input section 32 by the user. If the scanner section 39 is used, the page acquisition section 366 compares the image data of the read pages with the monochrome print data stored in the storage section 38. The page acquisition section 366 compares the image data with each page of the printing data in the monochrome print data to detect a page of which the similarity degree with the image data is higher. The page acquisition section 366 acquires page information containing information indicating the detected pages. Furthermore, if the page identification image indicating the page is printed on the print object, the page acquisition section 366 may acquire the page information based on a page identification image. The page identification image is, for example, a numeral indicating a page or a figure such as a barcode indicating the page.

Figure 2:
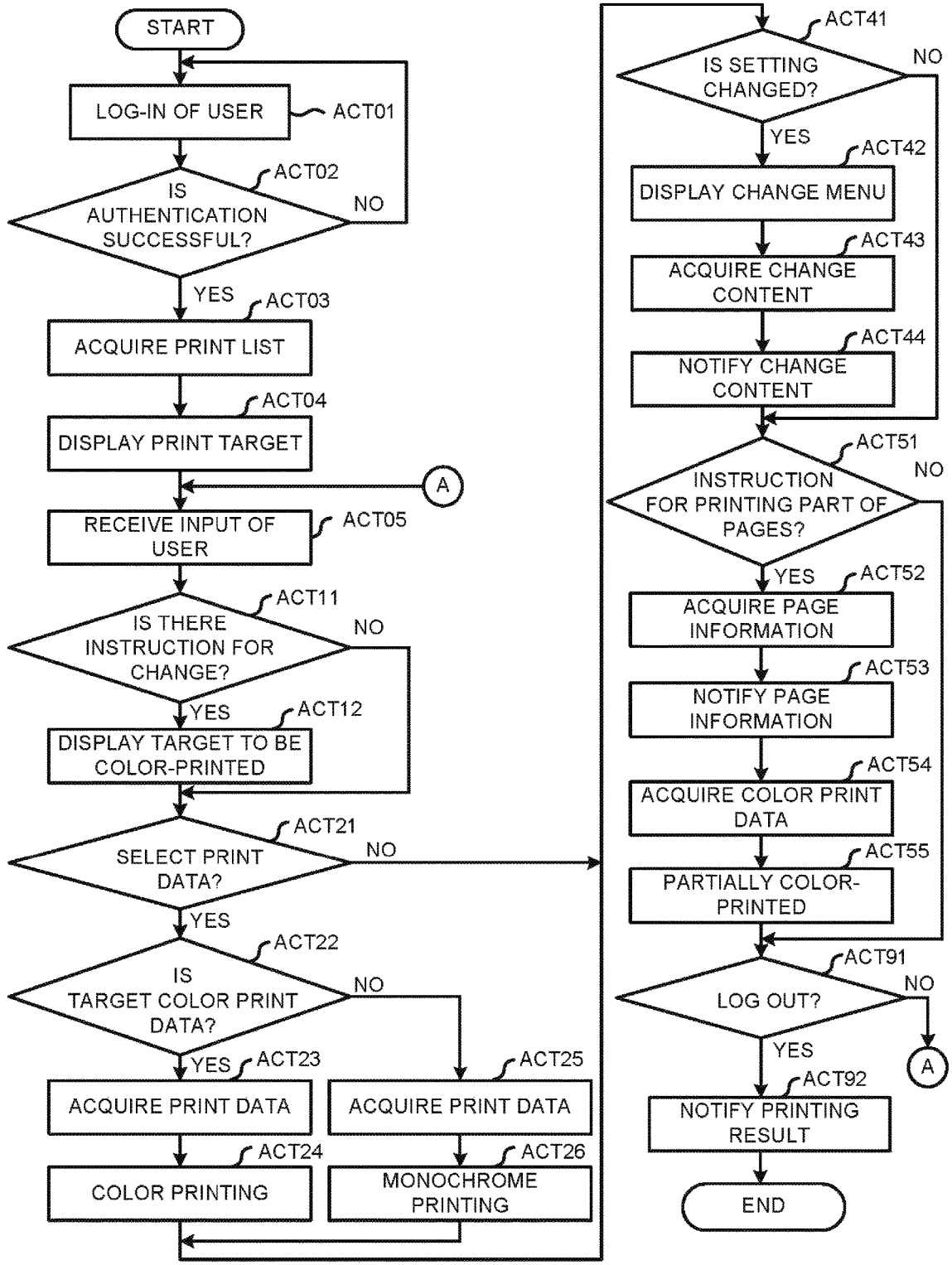
FIG. 2 is a flowchart illustrating procedures when an image forming apparatus carries out a printing operation.

Hereinafter, with reference to FIG. 2, the operations executed when the image forming apparatus 30 of the present embodiment carries out a printing operation are described. FIG. 2 is a flowchart illustrating procedures when the image forming apparatus 30 carries out a printing operation. The authentication section 361 authenticates log-in of a user with the use of the user ID and the password (ACT 01). The authentication section 361 determines whether or not the authentication is successful (ACT 02). If the authentication is failed (No in ACT 02), the authentication section 361 returns to the processing in ACT 01. If the authentication is successful (Yes in ACT 02), the list acquisition section 362 acquires the print data list containing print data of the user the log-in of whom is authenticated (ACT 03). The print data list acquired in ACT 03 only contains the monochrome print data. The list acquisition section 362 enables the display section 33 to display the print data list (ACT 04).

Figure 3:
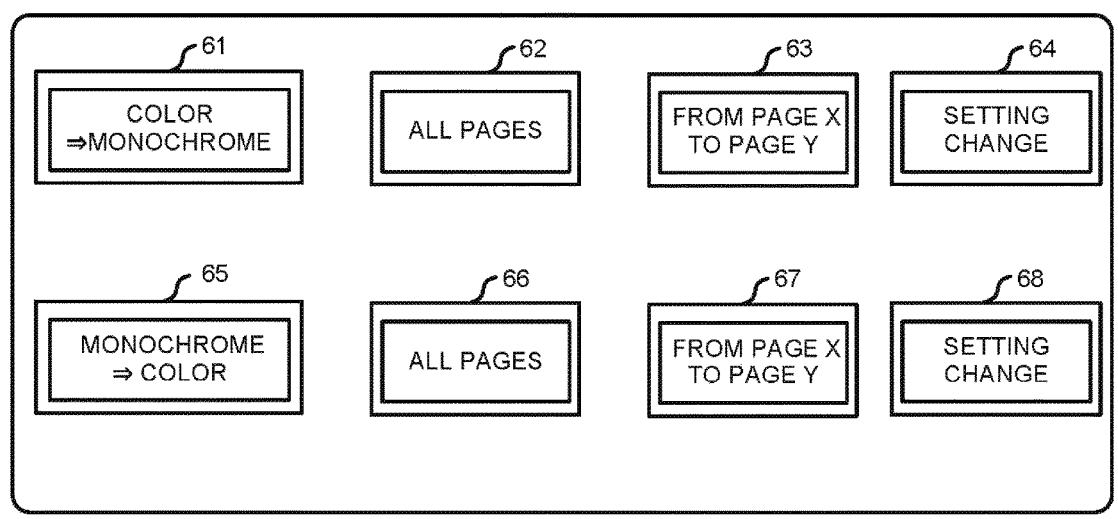
FIG. 3 is a diagram exemplifying a screen on a display section when an operation of a user is received.

After the authentication of the log-in of the user is successful, the image forming apparatus 30 receives following operations of the user. The first operation refers to selection on the print data desired to be printed among the print data contained in the print data list displayed on the display section 33. The second operation refers to an operation on a change key capable of selecting the color printing. The third operation refers to an operation for instructing the setting change. The fourth operation refers to an operation for instructing the execution of the color printing for a part of the document. The fifth operation refers to an instruction of log-out. FIG. 3 is a diagram exemplifying a screen displayed on a display section 33 when the second, the third and the fourth operations of a user are received. In the screen which is shown as an example, change keys 61 and 65 used to switch the color printing and the monochrome printing and keys 62~64 and 66~68 respectively corresponding to the change keys 61 and 65 are contained. The keys 62, 63, 66 and 67 are used to select a page severing as a change target. The keys 64 and 68 are used to instruct the change of setting.

The input section 32 receives an operation of the user (ACT 05). The list acquisition section 362 determines whether or not the operation received by the input section 32 is an operation on the change key (ACT 11). If the input section 32 receives no operation on the change key (No in ACT 11), the list acquisition section 362 proceeds to the processing in ACT 21. If the input section 32 receives an operation on the change key (Yes in ACT 11), the list acquisition section 362 acquires the print data list containing the color print data again. The list acquisition section 362 enables the display section 33 to display the newly acquired print data list (ACT 12).

The print data acquisition section 363 determines whether or not the operation received by the input section 32 is selection on the print data (ACT 21). If the operation is not the selection on the print data (No in ACT 21), the print data acquisition section 363 proceeds to processing in ACT 41. If the operation is the selection on the print data (Yes in ACT 21), the print data acquisition section 363 carries out determination on the selection information received by the input section 32 (ACT 22). The determination carried out in ACT 22 refers to determination on whether or not the print data indicated by the selection information is the color print data.

If the selection information indicates the color print data (Yes in ACT 22), the print data acquisition section 363 acquires the color print data from the server 20 (ACT 23). The print data acquisition section 363 enables the image forming section 37 to print based on the acquired color print data (ACT 24). If the selection information indicates the monochrome print data (No in ACT 22), the print data acquisition section 363 acquires the monochrome print data (ACT 25). The print data acquisition section 363 enables the image forming section 37 to print based on the acquired monochrome print data (ACT 26).

The setting change acquisition section 365 determines whether or not the operation input into the input section 32 is an operation for instructing the setting change (ACT 41). If no operation for instructing the setting change is input (No in ACT 41), the setting change acquisition section 365 proceeds to the processing in ACT 51. If an operation for instructing the setting change is input (Yes in ACT 41), the setting change acquisition section 365 enables the display section 33 to display a change menu (ACT 42). The content displayed in the change menu includes a list of contents contained in the setting information and a list of candidates of changeable contents.

The user carries out an operation for selecting a candidate of the changeable content from the change menu displayed on the display section 33 for the input section 32. The setting change acquisition section 365 acquires setting change information indicating the change content of the setting information received by the input section 32 (ACT 43). The setting change acquisition section 365 outputs the setting change information to the communication section 31 and enables the communication section 31 to transmit the setting change information to the server 20 (ACT 44).

The page, acquisition section 366 determines whether or not an operation received by the input section 32 is an instruction for executing a color printing on a part of the document (ACT 51). If the operation is not the instruction for executing a color printing on a part of the document (No in ACT 51), the page acquisition section 366 proceeds to the processing in ACT 91. If the operation is the instruction for executing a color printing on a part of the document (Yes in ACT 51), the page acquisition section 366 acquires the page information (ACT 52). The page acquisition section 366 outputs the page information to the communication section 31 and enables the communication section 31 to transmit the page information to the server 20 (ACT 53). The print data acquisition section 363 acquires the color print data in which the page indicated by the page information is set as a print target from the server 20 (ACT 54). The print data acquisition section 363 enables the image forming section 37 to print based on the acquired color print data (ACT 55).

The printing result notification section 364 determines whether or not an operation received by the input section 32 is an instruction for log-out (ACT 91). If the operation is not the instruction for log-out (No in ACT 91), the printing result notification section 364 returns to the processing in ACT 05. If the operation is the instruction for log-out (Yes in ACT 91), the printing result notification section 364 generates a printing result indicating the print data used in the final printing. The printing result notification section 364 outputs the printing result to the communication section 31 and enables the communication section 31 to transmit the printing result to the server 20 (ACT 92). A series of operations is terminated through the notification of the printing result to the server 20.

Figure 5:
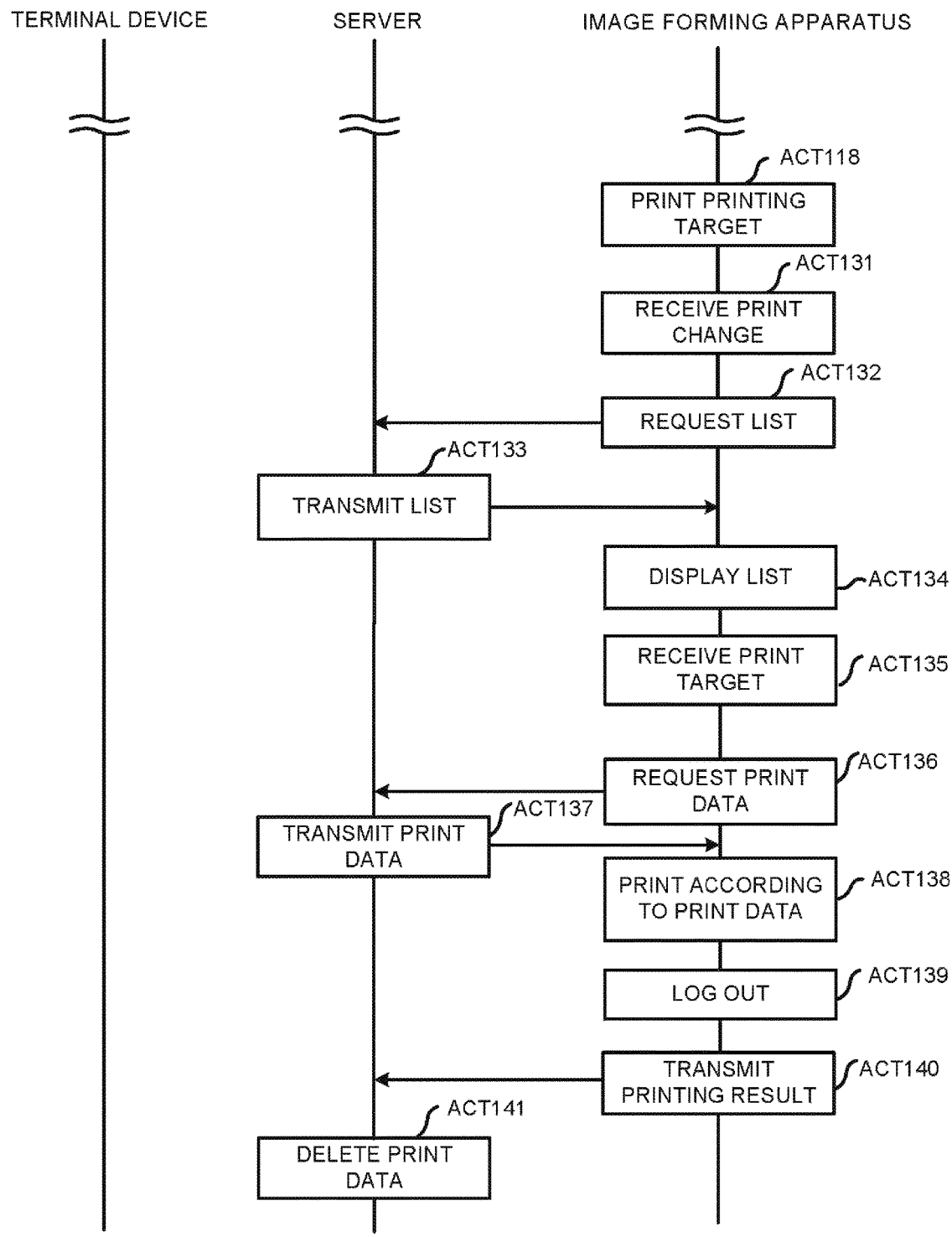
FIG. 5 is a sequence diagram illustrating procedures when a color printing is carried out after the monochrome printing is carried out.
Figure 6:
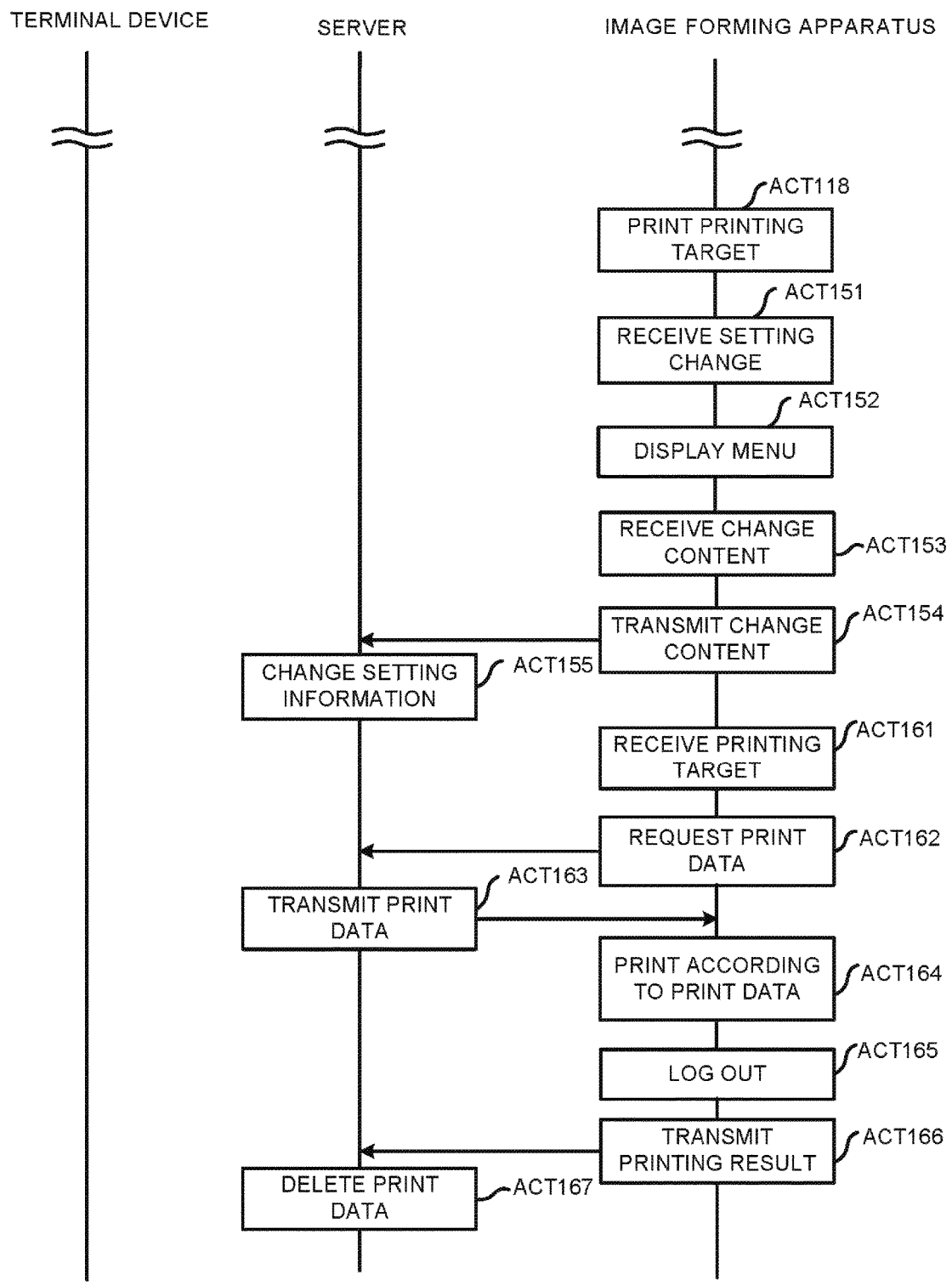
FIG. 6 is a sequence diagram illustrating procedures when a printing operation is carried out with the use of print data of which setting information is changed after the monochrome printing.
Figure 7:
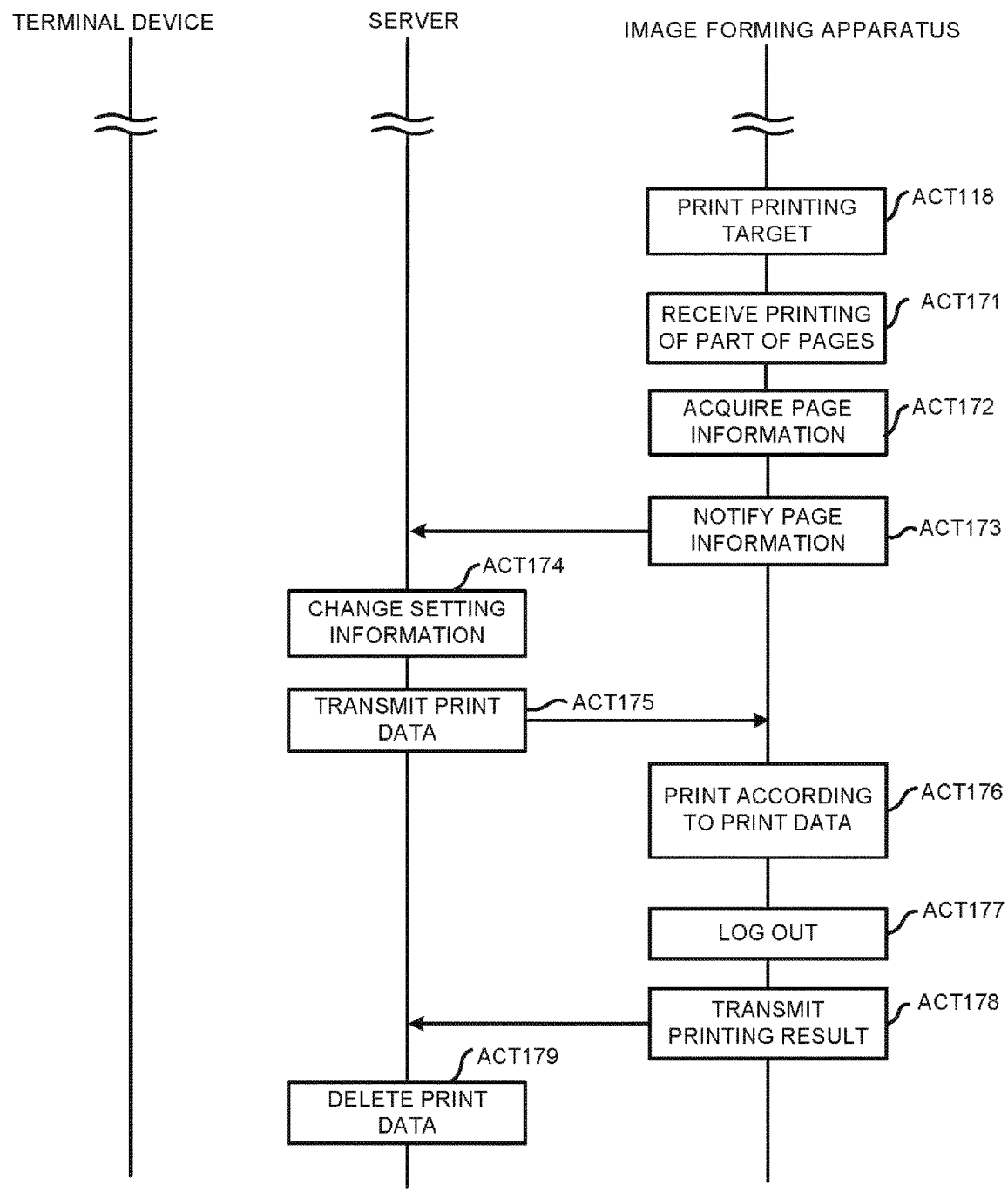
FIG. 7 is a sequence diagram illustrating procedures when the color printing is carried out on a part of pages after the monochrome printing.

Hereinafter, with reference to FIGS. 4, 5, 6 and 7, procedures of a printing operation carried out in the image forming system 1 of the present embodiment are described. Furthermore, as the processing in ACT 101-ACT 118 in FIGS. 5-7 is identical to that in FIG. 4, the description thereof is omitted.

Figure 4:
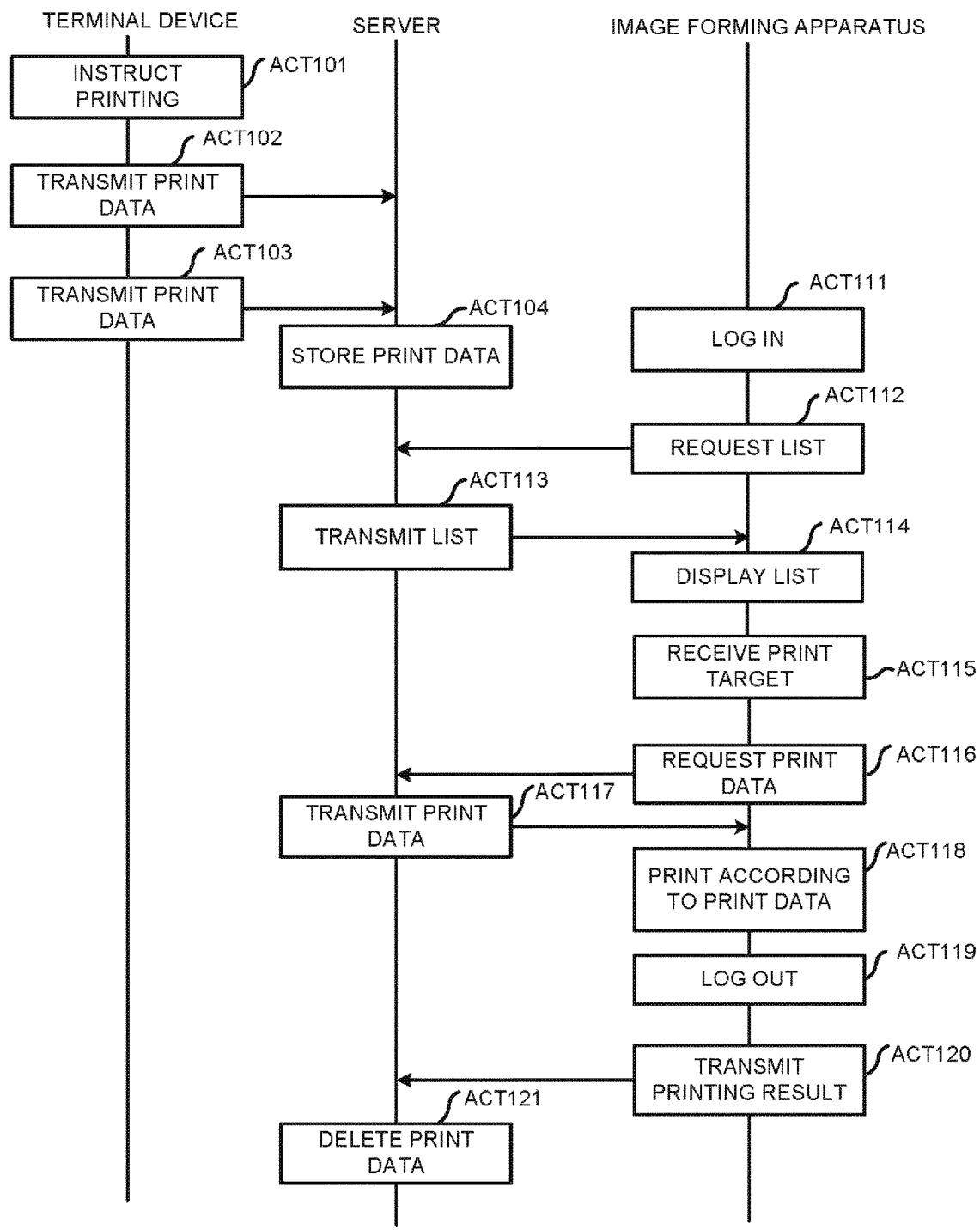
FIG. 4 is a sequence diagram illustrating procedures when a monochrome printing is carried out.

FIG. 4 is a sequence diagram illustrating procedures when the monochrome printing is carried out in the present embodiment. The sequence shown in FIG. 4 indicates a case in which the monochrome printing is carried out. The terminal device 10 receives an instruction for printing from the user (ACT 101). The terminal device 10 transmits the monochrome print data serving as a print target that is indicated by the printing instruction to the server 20 (ACT 102). The terminal device 10 also transmits the color print data serving as a print target to the server 20 (ACT 103). The server 20 stores the monochrome print data and the color print data received from the terminal device 10 and the user ID in an associated manner (ACT 104).

The user, after the printing instruction is input into the terminal device 10, operates one image forming apparatus 30 to log in the image forming apparatus 30 (ACT 111). The image forming apparatus 30 requests a print data list indicating the monochrome print data associated with the user ID of the user who logs in from the server 20 (ACT 112). The server 20 transmits the print data list generated in response to the request to the image forming apparatus 30 (ACT 113).

The image forming apparatus 30 enables the display section 33 to display the print data list received from the server 20 (ACT 114). The image forming apparatus 30 receives an operation of the user to select monochrome print data serving as a print target (ACT 115). The image forming apparatus 30 requests the selected monochrome print data from the server 20 (ACT 116). The server 20 transmits the monochrome print data requested by the image forming apparatus 30 to the image forming apparatus 30 (ACT 117).

The image forming apparatus 30 prints according to the monochrome print data received from the server 20 (ACT 118). The image forming apparatus 30 receives a log-out operation by the user (ACT 119). The image forming apparatus 30 transmits a printing result indicating the monochrome print data that is finally printed to the server 20 (ACT 120). The server 20 deletes the color print data corresponding to monochrome print data shown in the printing result from the stored color print data (ACT 121).

FIG. 5 is a sequence diagram illustrating procedures when a change to the color printing is carried out after the monochrome printing is carried out in the present embodiment.

In a case in which the user is not satisfied with the print object that is printed monochromatically, the user operates the change key of the image forming apparatus 30. The image forming apparatus 30 receives the operation on the change key (ACT 131). The image forming apparatus 30 requests a print data list from the server 20 (ACT 132). The server 20 transmits the print data list generated in response to the request to the image forming apparatus 30 (ACT 133).

The image forming apparatus 30 enables the display section 33 to display the print data list received from the server 20 (ACT 134). The list displayed on the display section 33 in ACT 134 also contains the color print data. The image forming apparatus 30 receives an operation of the user to select the color print data serving as a printing target (ACT 135). The image forming apparatus 30 requests the selected color print data from the server 20 (ACT 136). The server 20 transmits the requested color print data to the image forming apparatus 30 (ACT 137).

The image forming apparatus 30 prints according to the color print data received from the server 20 (ACT 138). The image forming apparatus 30 receives the log-out operation by the user (ACT 139). The image forming apparatus 30 transmits the printing result indicating the color print data that is finally printed to the server 20 (ACT 140). The server 20 deletes the monochrome print data corresponding to the color print data indicated by the printing result from the stored monochrome print data (ACT 141).

FIG. 6 is a sequence diagram illustrating procedures when a printing operation is carried out with the use of print data of which setting information is changed after the monochrome printing in the present embodiment.

In a case in which the user is not satisfied with the print object that is printed according to the current setting information, the user carries out an operation of the setting change for the image forming apparatus 30. The image forming apparatus 30 receives an instruction for the setting change (ACT 151). The image forming apparatus 30 enables the display section 33 to display the change menu relating to the setting information (ACT 152). The image forming apparatus 30 receives the change content of the setting information and acquires the setting change information indicating the change content (ACT 153). The image forming apparatus 30 transmits the setting change information to the server 20 (ACT 154). The server 20, based on the setting change information received from the image forming apparatus 30, changes the setting information in the stored print data (ACT 155). The print data in which setting information is changed is the print data associated with the user ID of the user who logs in the image forming apparatus 30.

The image forming apparatus 30 receives an operation of the user to select the monochrome print data or the color print data serving as a printing target (ACT 161). The image forming apparatus 30 requests the selected print data from the server 20 (ACT 162). The server 20 transmits the print data requested from the image forming apparatus 30 to the image forming apparatus 30 (ACT 163). The print data transmitted to the image forming apparatus 30 refers to the print data in which the setting information is changed in ACT 155.

The image forming apparatus 30 receives the print data in which the setting information is changed from the server 20 to print based on the print data (ACT 164). The image forming apparatus 30 receives a log-out operation by the user (ACT 165). The image forming apparatus 30 transmits the printing result indicating the print data that is finally printed to the server 20 (ACT 166). The server 20 deletes the print data corresponding to the print data indicated by the printing result from the stored monochrome and color print data (ACT 167).

FIG. 7 is a sequence diagram illustrating procedures when the color printing is carried out on a part of pages after the monochrome printing in the present embodiment.

The user carries out an operation for instructing the color printing on a part of pages in a case in which a part of pages of the print object which is printed monochromatically is desired to be color-printed for the image forming apparatus 30. The image forming apparatus 30 receives the operation for instruction to print a part of pages with the color (ACT 171). The image forming apparatus 30 acquires the page information indicating the pages to be color-printed (ACT 172). The target indicating that a part of pages are color-printed refers to the color print data corresponding to the monochrome print data that is finally printed. The image forming apparatus 30 transmits the page information to the server 20 (ACT 173).

The server 20 receives the page information from the image forming apparatus 30. The server 20 changes the setting information of the color print data indicated by the page information and changes the color print data to color print data in which the pages to be printed are restricted (ACT 174). The server 20 transmits the color print data in which the setting information is updated to the image forming apparatus 30 (ACT 175). The image forming apparatus 30 receives the color print data in which the setting information is updated from the server 20 and prints based on the color print data (ACT 176).

The image forming apparatus 30 receives the log-out operation by the user (ACT 177). The image forming apparatus 30 transmits the printing result indicating the print data that is finally printed to the server 20 (ACT 178). The server 20 deletes the monochrome print data corresponding to the color print data indicated by the printing result from the stored monochrome print data (ACT 179). Furthermore, the server 20, instead of the deletion of the print data, may replace the monochrome printing data of a part of pages in the monochrome print data with the color printing data.

In the image forming system 1, even if the user instructs the execution of the monochrome printing, the monochrome print data and the color print data are stored in the server 20. If the user is not satisfied with the print object that is printed monochromatically, the user can obtain the print object to be color-printed through operating the image forming apparatus 30. The user can change the setting information in the print data through operating the image forming apparatus 30. The user operates the image forming apparatus 30 to be capable of printing a part of pages of the print object with color. If the user is not satisfied with the print object printed with the image forming apparatus 30, it is not necessary for the user to operate the terminal device 10 again to change the setting relating to the printing. In the image forming system 1, the user is not necessary to move between the terminal device 10 and the image forming apparatus 30, thus reducing the troublesome jobs for the user.

Furthermore, in the foregoing embodiment, only the color printing data for the color printing may be contained in the print data. In this case, if the monochrome printing is designated in the setting information, the control section 36 converts the color printing data into the monochrome printing data. The control section 36 outputs print data containing the monochrome printing data obtained by converting the color printing data and the setting information to the image forming section 37. Further, the printing result notification section 364 notifies the server 20 of the print data containing the monochrome printing data as a printing result. In the server 20, the print data management section 22 updates the print data containing the color printing data with the monochrome print data received from the image forming apparatus 30. In this way, the consumption in the storage capacity of the print data storage section 23 can be reduced through transmitting the print data only containing the color printing data by the terminal device 10.

Further, in the foregoing embodiment, the monochrome printing and the color printing are described as targets; however, it is not limited to this. A two-color printing which reduces the number of colors used in the printing to print may be described as a target. Further, in the foregoing embodiment, an operation of transmitting the color print data after the terminal device transmits the monochrome print data is described. However, it is not limited to this. The terminal device may transmit the monochrome print data and the color print data to the server simultaneously.

Further, in each foregoing embodiment, in addition to the color print data, the terminal device may transmit the duplex print data used in the duplex printing. In addition to the color print data, the terminal device may transmit intensive print data which is obtained by putting a plurality of pages together in one page to be printed to the server.

Further, the image forming apparatus of each foregoing embodiment may comprise a print data management section and a print data storage section. That is, the server and the image forming apparatus may be integrated into one device. If the image forming system includes a plurality of the image forming apparatuses, it is applicable that any one of the plurality of the image forming apparatuses is equipped with the print data management section and the print data storage section. In this case, the image forming apparatus equipped with the print data management section and the print data storage section operates similarly to the server with respect to other image forming apparatuses.

In accordance with at least one embodiment described above, as the print data based on a plurality of setting is stored in the server, the user operates the image forming apparatus to obtain the print objects that are set differently from one another, thereby improving the convenience of the user.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming system, comprising:
a processor that facilitates execution of instructions to perform operations, comprising:
transmitting first print data to print an image in monochrome, second print data to print the image in color and a user ID;
storing, to a storage device, the first print data, the second print data and the user ID in an associated manner;
authenticating a user based on the user ID to form an authenticated user ID;
acquiring a list including the first and the second print data associated with the authenticated user ID;
acquiring one print data selected from the list;
printing the image according to the one print data;
reading an image on pages of a print object to be printed according to the first print data;
detecting an image similar to the image on the pages of the print object from the first print data to acquire a page information indicating pages designated by the user serving as pages of a print object to be printed according to the first print data; and
printing images of pages indicated by the page information among images formed based on the second print data corresponding to the printed first print data.

2. The image forming system according to claim 1, wherein the operations further comprise
deleting, from the storage device, at least the one print data of the first print data and the second print data after the printing is executed.

3. The image forming system according to claim 2, wherein the operations further comprise
deleting, from the storage device, at least the one print data of the first print data and the second print data after authenticating the user.

4. The image forming system according to claim 1, wherein
the first and the second print data contains printing image data indicating an image to be printed and setting information relating to the printing; and
wherein the operations further comprise
printing an image which is formed based on the printing image data in accordance with the setting information.

5. The image forming system according to claim 4, wherein the operations further comprise
acquiring change of the setting information contained in the first print data or the second print data, and
printing an image formed according to the printing image data in accordance with setting information to which the change of the setting information is applied.

6. The image forming system according to claim 5, wherein the operations further comprise
updating print data stored in the storage device based on the change of the setting information.

7. An image forming apparatus, comprising:
a processor that facilitates execution of instructions to perform operations, comprising:
receiving first print data to print an image in monochrome, second print data to print the image in color and a user ID from a terminal device;
storing the first print data, the second print data and the user ID in an associated manner to a storage device;
authenticating a user;
generating a list including the first print data and the second print data associated with the user ID of the user;
acquiring one print data from the list;
printing an image formed according to the one print data;
reading an image on pages of a print object to be printed according to the first print data;
detecting an image similar to the image on the pages of the print object from the first print data to acquire a page information indicating pages designated by the user serving as pages of a print object to be printed according to the first print data; and
printing images of pages indicated by the page information among images formed based on the second print data corresponding to the printed first print data.

8. An image forming system, comprising:
a processor that facilitates execution of instructions to perform operations, comprising:
transmitting first print data to print an image in monochrome, second print data to print the image in color and a user ID;
storing, to a storage device, the first print data, second print data and the user ID in an associated manner;
authenticating a user based on the user ID;
acquiring a list including the first print data and the second print data associated with the user ID;
acquiring one print data selected from the list;
printing the image according to the print data;
reading an image on pages of a print object to be printed according to the first print data; and
acquiring page information indicating pages designated by the user serving as pages of a print object to be printed according to the first print data based on page identification image contained in the image read; and
printing images of pages indicated by the page information among images formed based on the second print data corresponding to the printed first print data; and
printing a page identification image indicating pages at a time an image is printed simultaneously.

9. The image forming system according to claim 8, wherein the operations further comprise
deleting at least one print data of the first print data and the second print data from the storage device after the printing is executed.

10. The image forming system according to claim 9, wherein the operations further comprise
deleting at least one print data of the first print data and the second print data from the storage device after the authentication of the user.

11. The image forming system according to claim 8, wherein the first print data and the second print data contains printing image data indicating an image to be printed and setting information relating to the printing; and
wherein the operations further comprise printing an image which is formed based on the printing image data in accordance with the setting information.

12. The image forming system according to claim 11, wherein the operations further comprise
acquiring change of the setting information contained in the first print data or the second print data, and
printing an image formed according to the printing image data in accordance with setting information to which the change of the setting information is applied.

13. The image forming system according to claim 12, wherein the operations further comprise
   updating print data stored in the storage device based on the change of the setting information.

* * * * *